United States Patent [19]

Schwartz

[11] Patent Number: 5,185,167
[45] Date of Patent: Feb. 9, 1993

[54] METHOD OF MAKING A STUFFED PRETZEL DOUGH PRODUCT AND COMPLETED STUFFED PRETZEL PRODUCT

[76] Inventor: Janet Schwartz, 4353 Frankford Ave., Philadelphia, Pa. 19124

[21] Appl. No.: 505,798

[22] Filed: Apr. 6, 1990

[51] Int. Cl.⁵ .................. A21D 13/00; A23P 1/08
[52] U.S. Cl. ............................ 426/94; 426/138; 426/283; 426/499; 426/500; 426/503
[58] Field of Search ............ 426/19, 94, 283, 138, 426/499, 500, 503

[56] References Cited

U.S. PATENT DOCUMENTS

| | | | |
|---|---|---|---|
| 3,976,791 | 8/1976 | Seiberlich | 426/19 |
| 4,251,201 | 2/1981 | Krysiak | 426/94 |
| 4,283,430 | 8/1981 | Doster et al. | 426/94 |
| 4,288,463 | 9/1981 | Groff et al. | 426/500 |
| 4,313,961 | 2/1982 | Tobia | 426/94 |
| 4,400,404 | 8/1983 | Persi | 426/524 |
| 4,661,361 | 4/1987 | Mongiello et al. | 426/94 |
| 4,759,939 | 7/1988 | Keller et al. | 426/499 |
| 4,880,653 | 11/1989 | Keller et al. | 426/499 |

*Primary Examiner*—Jeanette Hunter
*Assistant Examiner*—Mary S. Mims
*Attorney, Agent, or Firm*—Caesar, Rivise, Bernstein, Cohen & Pokotilow, Ltd.

[57] ABSTRACT

A method of making a substantially elongated soft pretzel product from pretzel dough with the end product having an edible filling comprising the steps of mixing the ingredients to form the soft pretzel dough, forming the pretzel dough in a generally continuous sheet having a thickness of about ¼" to ⅜", cutting the sheet of dough into a piece which is substantially rectangular in shape and has substantially parallel top and bottom ends and two substantially parallel sides, placing the edible filling material substantially in the center of the piece of dough, wherein the filling comprises meat and/or cheese and/or other foodstuffs, folding the bottom end of the piece over the edible filling material so that the top end of the piece forms a flap and the edible filling material is substantially enclosed therein, pressing the bottom end of the piece of dough to secure the bottom end to the piece, trimming away any excess of the flap which extends beyond the point where the bottom end is secured to the piece, securing each of the two ends of the piece to enclose the edible filling material within the piece and to form the shape of the pretzel, refrigerating the unbaked pretzel product for a time period in the range of 4 to 24 house at a temperature in the range of 35° F. to 40° F., dipping the pretzel in a caustic soda solution and baking at a temperature of approximately 550° F. for a time period in the range of 8 to 10 minutes.

11 Claims, 2 Drawing Sheets

1. START WITH PRETZEL DOUGH.

2. PRESS DOUGH INTO RECTANGLE.

3. ADD CHEESE AND PEPPERONI.

4. TIGHTLY ROLL LAYERS TOGETHER, STARTING AT SHORT END.

5. PINCH AND SEAL ENDS OF DOUGH.

6. DIP INTO CAUSTIC, THEN SPRINKLE WITH SALT.

METHOD OF MAKING A STUFFED PRETZEL DOUGH PRODUCT AND COMPLETED STUFFED PRETZEL PRODUCT

BACKGROUND OF THE INVENTION

This invention relates generally to preparing foodstuffs and more specifically to preparing a hand-shaped, substantially elongated, chewy, soft pretzel dough product and completed soft pretzel product which encloses an edible filling material such as meat, cheese and/or other foods.

There are basically two distinct types of pretzels. These may be designated as the soft pretzel, which is intended to be eaten the same day it is baked, and the hard pretzel, which may be stored and eaten at a much later time without losing its general qualities.

Pretzel characteristics are dependent upon a number of factors, including the variety of ingredients and method of manufacture and storage. A variety of flours may be used to make pretzel dough, such as patent, straight and clear flours, and pretzels may be made with and without shortening.

Pretzels are made in a variety of sizes and shapes. Some are machine-stamped and others are shaped by hand as in the present invention. Machine-made pretzels are generally made in the smaller sizes and may be in the form of the ordinary twisted variety or in sticks, etc. Handmade pretzels however, are usually made in larger sizes than the machine-stamped variety and may take a variety of shapes depending upon the method of shaping.

A high quality pretzel generally has a pleasing flavor, a smooth, glossy yellow-brown outside appearance, a white inside appearance and a texture which facilitates mastication without the product "doughing" in the mouth. A high quality stuffed pretzel additionally, must retain its edible filling for ease of handling and consummation.

Several methods of making a wide variety of pretzels are described in Technical Bulletin 46, from the U.S. Dept. of Agriculture, Washington, DC (November 1927).

Methods for making stuffed pretzels have suffered from several drawbacks, most notably, they produce a product which is oftentimes soggy and unappetizing due to the moisture content of the various fillings used. Additionally, previous methods suffered from the defect of the pretzel filling being exposed to the caustic soda solution when the pretzel was dipped prior to baking, which resulted in an inedible product. This result was oftentimes due to deficient prior methods of forming and shaping the pretzel which caused the pretzel to come apart during the manufacture thereof.

Patents disclosing methods of making hand-held edible foods which are oftentimes filled, are those disclosed in U.S. Pat. Nos. 4,608,259 (Cortopossi), 4,725,444 (Wilkins), 4,741,908, and 4,795,652 (Cooper).

Prior to the method and product of the present invention, there has not been a fast and inexpensive method of producing a hand-held, appetizing, and consistent stuffed pretzel product with a variety of edible fillings.

OBJECTS OF THE INVENTION

Accordingly, it is a general object of this invention to provide a method of making a hand-shaped soft pretzel product which is simple and yet produces an appetizing foodstuff which contains an edible filling material.

It is a further object of this invention to provide a method of making a soft pretzel product which is easy to hold while being consumed.

It is still a further object of this invention to provide a method for making an aesthetically pleasing soft pretzel product.

It is yet still a further object of this invention to provide a method for making a soft pretzel product which may be chilled or frozen without affecting its appearance or taste.

It is still a further object of this invention to provide a method for making a soft pretzel product which is chewy and facilitates mastication.

SUMMARY OF THE INVENTION

These and other objects of this invention are achieved by providing a method of making a substantially elongated soft pretzel product from pretzel dough with the end product having an edible filling. The method comprises the steps of mixing the ingredients to form the soft pretzel dough, forming the pretzel dough in a generally continuous sheet having a thickness of about $\frac{1}{8}''$ to $\frac{3}{8}''$, cutting the sheet of dough into a plurality of pieces, each of which is substantially rectangular in shape and has substantially parallel top and bottom ends and two substantially parallel sides, placing the edible filling material substantially in the center of the piece of dough, wherein the filling material comprises meat and/or cheese and/or other foodstuffs, folding the bottom end of the piece over the edible filling material so that the top end of the piece forms a flap and the edible filling material is substantially enclosed therein, pressing the bottom end of the piece of dough to secure the bottom end to the piece, trimming away any excess of the flap which extends beyond the point where the bottom end is secured to the piece, securing each of the two ends of the piece to enclose the edible filling material within the piece and to form the shape of the pretzel, refrigerating the unbaked pretzel dough product for a time period in the range of 4 to 24 hours at a temperature in the range of 35° F. to 40° F., dipping the unbaked pretzel product in a caustic soda solution and baking at a temperature of approximately 550° F. for a time period in the range of 8 to 10 minutes.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
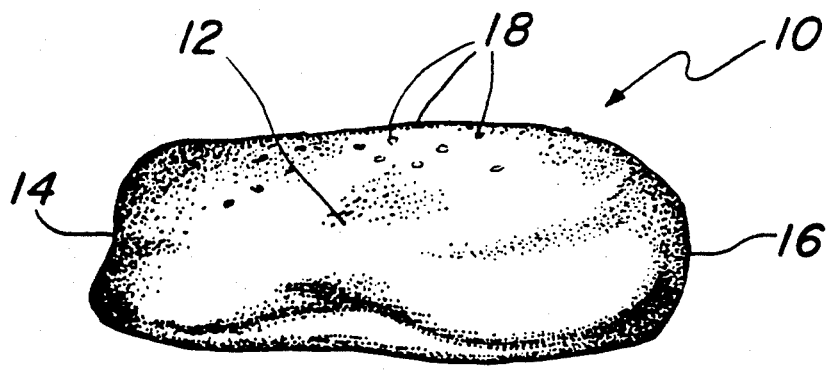
FIG. 1 is a side view of a completed stuffed pretzel product made in accordance with the method of the present invention.
Figure 2:
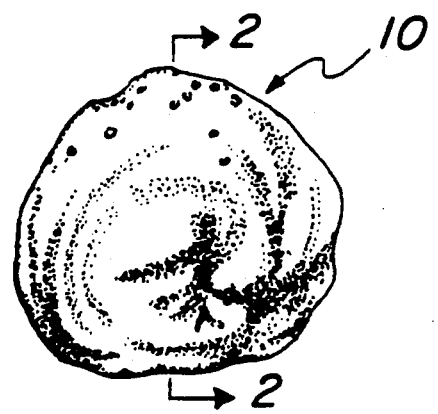
FIG. 2 is an end view of a completed stuffed pretzel product made in accordance with the method of the present invention.

Referring now to various figures of the drawings where like reference numerals refer to like parts there is shown at 10 in FIGS. 1 and 2, a completed pretzel dough product in accordance with the method of the present invention. As can be seen clearly in FIG. 1, the pretzel 10 is substantially elongated with a generally cylindrical cross-section and has a longitudinal axis 12, and two ends 14 and 16. Additionally, the product 10 may have crystallized salt 18 on its exterior surface.

Figure 3:
FIG. 3 is a cross sectional view of a completed stuffed pretzel product made in accordance with the method of the present invention taken along line 2—2.

As shown more clearly in FIG. 3, the completed pretzel product 10 has an edible filling 20 comprising meat 22 and/or cheese 24.

Figure 4A:
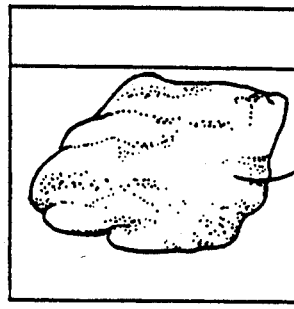
FIG. 4A through 4F show the steps in making a completed stuffed pretzel product in accordance with the method of the present invention.

As shown in FIGS. 4A through 4F, the method of the present invention comprises a series of steps. In order to prepare the pretzel dough 40, the baker must thoroughly mix the ingredients (not shown) in the following proportions: approximately 100 pounds of a high gluten flour such as clear spring flour, approximately 1 pound of yeast and approximately 6 gallons of water. Although other types of flour may be used, it is preferable to use clear spring flour to provide the finished product with the desired chewy texture and consistency. After the dough 40 is formed, it may be kneaded or rolled into a generally continuous sheet as shown in FIG. 4A, to a approximate thickness of about $\frac{1}{4}$" to $\frac{3}{8}$". This thickness is desirable to facilitate folding and shaping of the product into its finished form.

Figure 4B:
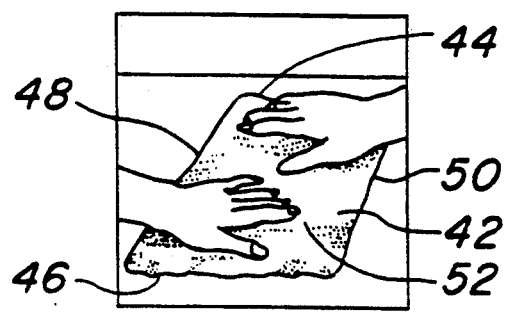

As shown in FIG. 4B, the baker then cuts and/or presses the sheet of dough into a piece 42 having a weight of approximately 3 ounces, which is substantially rectangular in shape and has a top end 44 substantially parallel to bottom end 46 and two substantially parallel sides 48 and 50.

The baker then places approximately 1.5 ounces of the edible filling material 22 substantially in the center 52 of the piece of dough 40. The filling preferably comprises meat 22 and/or cheese 24 and/or other foodstuffs (not shown). In order to prevent the finished product from being soggy, it is preferable to use filling materials which have a low moisture content, such as pepperoni, ham and/or cheeses such as mozzarella, provolone, and any other suitable cheese.

Figure 4C:
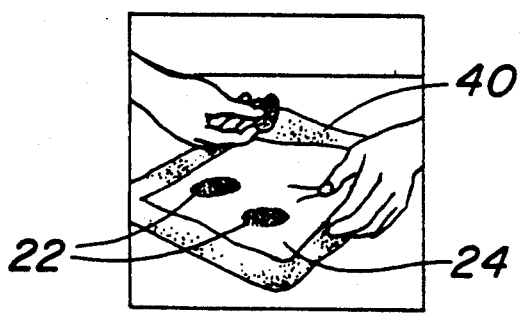
Figure 4D:
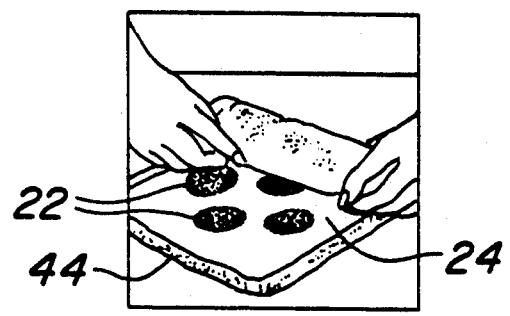

As shown more clearly in FIGS. 4C and 4D, once the filling 20 is placed on the dough 40, the bottom end 46 of the piece 40 is folded over the edible filling material 20 so that the top end 44 of the piece 40 forms a flap approximately 1" wide (not shown) and the edible filling material is substantially enclosed therein. Alternatively, the piece 40 may be rolled without forming a flap, to utilize all of the piece 40 in the finished product 10 to minimize waste.

Figure 4E:
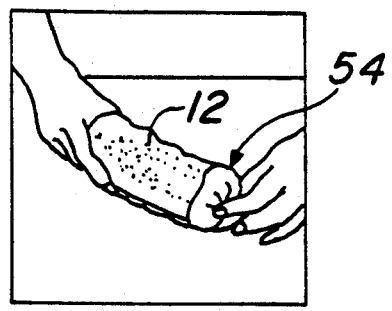

In order to seal the piece 40 along its longitudinal axis 12, it is preferable that the baker press the bottom end 46 of the piece of dough 40 to fixedly secure the bottom end 46 to the piece 40 to prevent the dough from unrolling. If a flap is formed, it is necessary to trim away any excess of the flap which extends beyond the generally cylindrical piece of dough. As shown in FIG. 4E, the baker must secure each of the two ends 48 and 50 of the piece 40 to enclose the edible filling material 20 within the piece. The baker may do so by pinching each of the ends 48 and 50 together with his/her fingers, after having tucked inside any loose filling material 20. It is vital that the dough completely seal the filling 20 and create a closed environment, to prevent any caustic soda solution 56 from entering into the pretzel interior. If this occurs, the pretzel product is inedible.

Figure 4F:
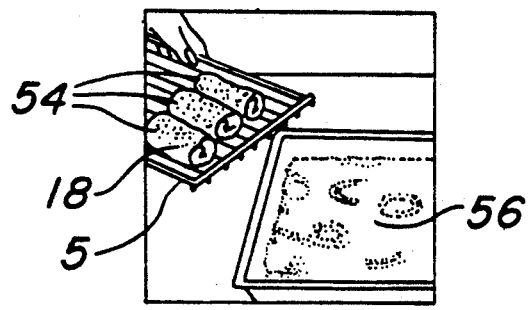

The generally cylindrically shaped unbaked product 54 is then refrigerated for a time period in the range of 4 to 24 hours at a temperature in the range of 35° F. to 40° F. to form a partial crust on the exterior of the dough which assists in forming the crusty surface upon baking. Refrigeration also retards the raising of the dough which further aids in providing the desired texture and consistency. As shown in FIG. 4F, the unbaked pretzel 54 is then dipped in a conventional caustic soda solution 56 to provide the finished product with the typical pretzel glaze and brown color after baking. The unbaked pretzel 54 is then sprinkled with crystalized salt 18 (sodium chloride) prior to baking.

The unbaked pretzel 54 is placed on a baking sheet, tray or rack 58, and then baked in an oven (not shown) at a temperature of approximately 550° F. for a time period in the range of 8 to 10 minutes. It is preferable that the pretzels be baked in an oven having a brick hearth to provide even and constant heat, although any suitable oven may be utilized.

After cooling, the completed pretzel is ready to be eaten or may be frozen. The generally cylindrical shape aids in the hand held consumption of the pretzel in awkward situations such as on the street, in a sports arena or concert, or any time when utensils are undesired or unavailable.

Without further elaboration the foregoing will so fully illustrate my invention that others may, by applying current or future knowledge, readily adapt the same for use under various conditions of service.

I claim:

1. A method of making a soft pretzel dough product from pretzel dough having an edible filling material therein, said method comprising the steps of:
    (a) mixing ingredients to form said pretzel dough;
    (b) forming said pretzel dough in a generally continuous sheet;
    (c) cutting said generally continuous sheet into a piece substantially rectangular in shape and having substantially parallel top and bottom ends and two substantially parallel sides;
    (d) placing edible filling material substantially in the center of said piece;
    (e) folding said bottom end of said piece over said edible filling material so that said top end of said piece forms a flap and said edible filling material is substantially enclosed by said piece;
    (f) pressing said bottom end of said piece of dough to secure said bottom end to said piece;
    (g) trimming away any excess of said flap which extends beyond the point where said bottom end is secured to said piece;
    (h) securing each of said two ends of said piece to enclose said edible filling material within said piece and to form the shape of said pretzel;
    (i), refrigerating said pretzel for a time period in the range of 4 to 24 hours at a temperature in the range of 35° F. to 40° F.;
    (j) dipping said pretzel in a caustic soda solution; and
    (k) baking said pretzel at a temperature of approximately 550° F. for a time period in the range of 8 to 10 minutes.

2. The method of claim 1 wherein said edible filling material comprises meat and cheese.

3. The method of claim 1 wherein said edible filling material comprises pepperoni and cheese.

4. The method of claim 1 wherein said edible filling material comprises ham and cheese.

5. The method of claim 1 wherein said edible filling material comprises cheese.

6. The method of claim 1 wherein said generally continuous sheet has a thickness of about ⅛" to ⅜".

7. An elongated baked soft pretzel dough product made by a method involving providing a major amount of soft pretzel dough having an edible filling material essentially completely enveloped therein, said method comprising the steps of:
 (a) mixing ingredients including clearing spring flour, yeast and water that will constitute pretzel dough;
 (b) forming said pretzel dough in a generally continuous sheet;
 (c) cutting said generally continuous sheet into a piece substantially rectangular in shape and having substantially parallel top and bottom ends and two substantially parallel sides;
 (d) placing edible filling material substantially in the center of said piece;
 (e) folding said bottom end of said piece over said edible filling material so that said top end of said piece forms a flap and said edible filling material is substantially enclosed by said piece;
 (f) pressing said bottom end of said piece of dough to secure said bottom end to said piece;
 (g) trimming away any excess of said flap which extends beyond the point where said bottom end is secured to said piece;
 (h) securing each of said two ends of said piece to enclose said edible filling material within said piece and to form the shape of said pretzel;
 (i) refrigerating said pretzel for a time period in the range of 4 to 24 hours at a temperature in the range of 35° F. to 40° F.;
 (j) dipping said pretzel in a caustic soda solution; and
 (k) baking said pretzel at a temperature of approximately 550° F. for a time period in the range of 8 to 10 minutes.

8. The pretzel product of claim 7 wherein said edible filling material comprises pepperoni.

9. The pretzel product of claim 7 wherein said edible filling material comprises ham.

10. The pretzel product of claim 7 wherein the composition of said soft pretzel dough comprises approximately 100 pounds of clear spring flour, approximately 1 pound of yeast and approximately 6 gallons of water.

11. The pretzel product of claim 7 wherein said edible filling material comprises cheese.

* * * * *